United States Patent

[11] 3,618,859

| | | |
|---|---|---|
| [72] | Inventor | Victor D. Watts<br>1310 E. Buckley, Brownfield, Tex. 79316 |
| [21] | Appl. No. | 74,676 |
| [22] | Filed | Sept. 23, 1970 |
| [45] | Patented | Nov. 9, 1971 |

[54] WIND ANCHOR FOR IRRIGATION PIPE
9 Claims, 3 Drawing Figs.

[52] U.S. Cl. .................................................. 239/212,
239/276
[51] Int. Cl. ...................................................... A01g 25/02
[50] Field of Search ........................................... 239/212,
213, 276; 137/344

[56] References Cited
UNITED STATES PATENTS

| | | | |
|---|---|---|---|
| 2,766,996 | 10/1956 | Jacoby .......................... | 239/212 X |
| 3,002,697 | 10/1961 | Jones ............................. | 239/212 |
| 3,230,969 | 1/1966 | Purtell ........................... | 137/344 X |

*Primary Examiner*—M. Henson Wood, Jr.
*Assistant Examiner*—John J. Love
*Attorney*—Charles W. Coffee ABSTRACT: A hub is journaled to the pipe on a side-roll agricultural irrigation system. An elongated anchor let extends to either side of the pipe from the hub. The rear leg is weighted so that as the pipe moves, the weighted rear leg drags behind. A wind vane on the hub extends above the pipe so when the wind moves the wind vane, the leeward leg is moved into anchoring position.

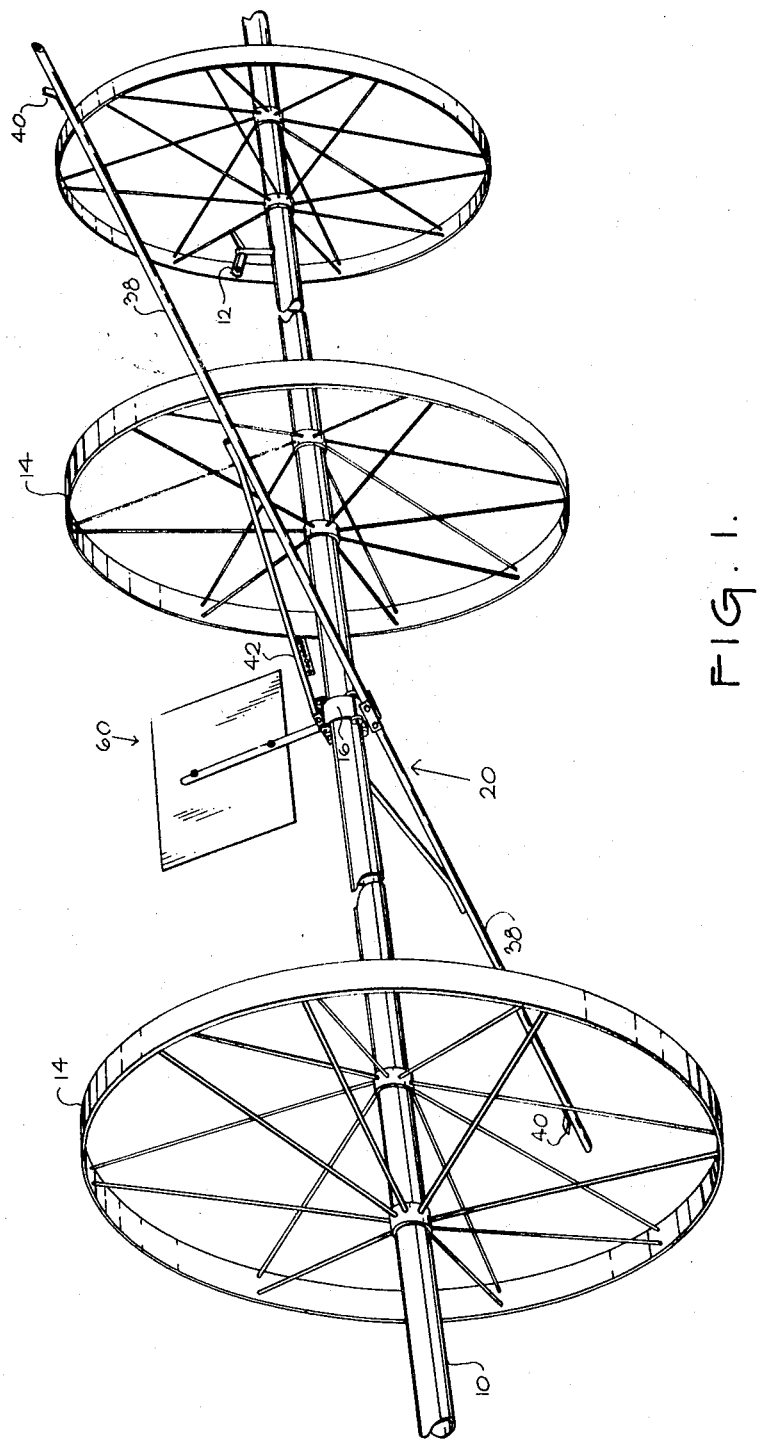

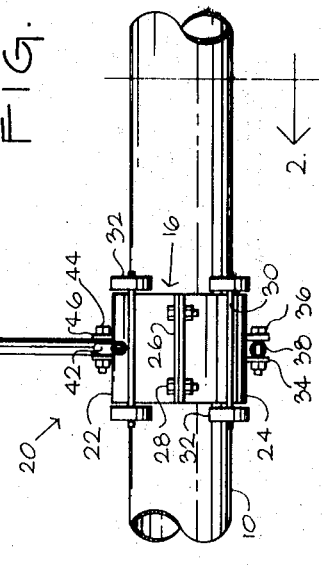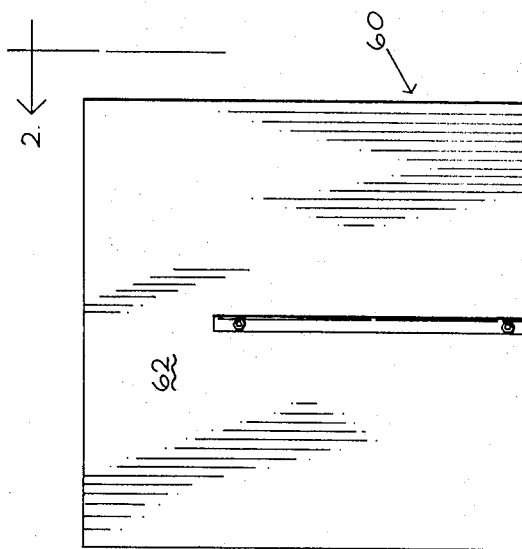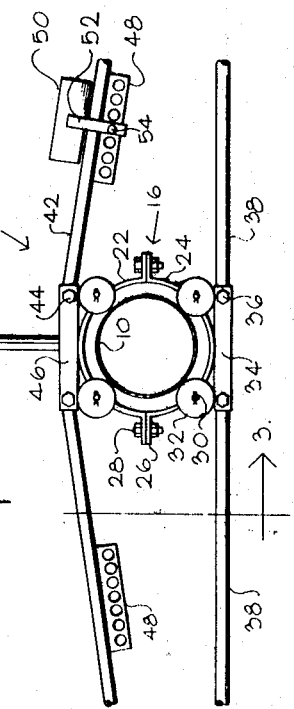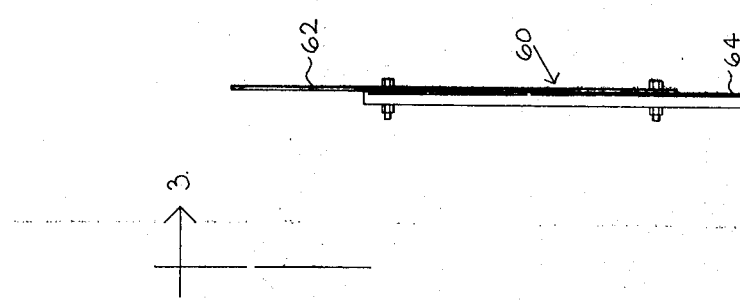

WIND ANCHOR FOR IRRIGATION PIPE

BACKGROUND OF THE INVENTION

1. Field of the Invention

This invention relates to agricultural irrigation and more particularly to fluid handling through a movable pipeline and the prevention of the wind from blowing the pipeline.

2. Description of the Prior Art

Movable irrigation pipelines are well known to the art and are shown in many patents and described in different publications. Specifically see the Department of Agriculture Leaflet No. 476 (Revised Nov. 1966) entitled "Sprinkler Irrigation," G.P.O.: No. 1966 0-236-409.

When the pipeline is empty of water, it is light and is susceptible to being blown by the wind. All irrigation systems have some susceptibility to being damaged by high winds, but more particularly the side-roll system. The side-roll system is that type irrigation system wherein the pipeline itself forms the axle for a series of wheels, which are coaxial with the line.

JACOBY, U.S. Pat. No. 2,766,996, shows an anchor which can be attached to one of the wheels of the side-roll system. Although JACOBY does not state specifically the purpose of his anchor, applicant assumes that it is to prevent it from being blown by the wind.

A more common type anchor in commercial use is an anchor which has an extended leg and which has a semicylindrical cup which fits over the pipe so in appearance it resembles the disclosure of CORNELIUS, U.S. Pat. No. 3,071,327. These anchors which are in commercial use must be attached manually to the line after it has been moved and detached before it is moved again.

In use, four pair of anchors are used in a typical line which is about 1,300 feet long, having one leg on one side of the pipe and the other leg on the other side of the pipe to prevent wind from blowing it in either direction.

The CORNELIUS, U.S. Pat. No. 3,071,327, patent itself is concerned with alignment and not wind anchoring. Also, applicant considers the Australian Pat. No. 246,424, issued in 1963 to Industrial Enterprises and invented by Wittmack, to be of interest. It shows two extendible anchor legs, however, these legs are projected by hydraulic pressure and are for purposes of alignment of the sprinkler and not to anchor against wind inasmuch as they would not be in the anchor position when there was no water in the pipe.

SUMMARY OF THE INVENTION

1. New and Different Function

I have invented an anchor which is attached to the pipe at all times while moving; therefore, it is not necessary for the operator to attach and detach it manually after each move. The anchor utilizes the force of the wind that might cause distruction to the pipe to set the anchor. The anchor is therefore fully automatic. The anchor includes a split hub which may be attached at convenient locations, e.g., four points along the pipeline and is freely rotatable on the pipeline. The two legs extend from the hub. The length of each leg is about thrice the radius of the wheels of the side-roll. The leg which is aft or behind the pipeline is weighted so that as the pipeline is being moved it drags behind. A wind vane is attached to the hub so that after the pipeline has been moved, if a high wind comes up from behind the pipeline, the force of the wind upon the vane will force the forward or leeward leg downward, causing it to anchor the line.

2. Objects of this Invention

An object of this invention is to anchor an irrigation pipeline against being blown by the wind.

Further objects are to achieve the above with a device that is sturdy, compact, durable, lightweight, simple, safe, efficient, versatile, and reliable, yet inexpensive and easy to manufacture, install, operate, and maintain.

Still further objects are to achieve the above with a method that is versatile, rapid, efficient, and inexpensive, and does not require skilled people to install, adjust, operate and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a perspective view of a portion of a pipeline with an anchor thereon according to this invention.

FIG. 2 is a partial view of the anchor showing the hub portion, taken substantially on line 202 of FIG. 3.

FIG. 3 is a front elevational view of the hub portion of the anchor taken on line 3—3 of FIG. 2.

DESCRIPTION OF THE PREFERRED EMBODIMENT

Referring to the drawing, elongated pipeline 10 has a plurality of sprinklers 12 mounted thereon. The pipeline is adapted to be connected to a source of water under pressure (not shown), thereby it is a conduit conveying water under pressure to the sprinklers 12.

The pipeline 10 is movingly supported by a plurality of wheels 14. As illustrated, these wheels are coaxial with the pipeline. Of course, there are other types of movable irrigation systems where the pipe is movingly supported by wheels which are not coaxial with the pipe. However, the main need for the anchor is with the side-roll-type system.

Hub 16 is attached around the pipeline 10. Specifically, on a system, four anchor units 20 would be used, one near each end and two between so there would be approximately 400 feet between anchors. The experience with the hand attached type anchor units has indicated that this spacing is sufficient. The hubs are composed of two semicylindrical units: top half-hub 22 and bottom half-hub 24. Each of the half-hubs has a flange 26 on either side of diametrical plane (FIG. 2) which has holes to receive bolts 28 whereby the half-hubs 22 and 24 are bolted together to form a cylindrical hub 16, which is coaxial and surrounding the pipeline 10.

Two rods 30 are attached to the top half-hub 22 and two rods 30 to the bottom half-hub 24. These rods extend past the edges of hub 16 and have rollers 32 attached to them. The rollers 32 bear against the pipeline 10 so that the hub 16 is journaled for rotation to the pipeline 10 and is free to roll around it with a minimum of friction.

Bottom ears 24 attached to the bottom half-hub 24 and bolts 36 through the ears 34 attached anchor legs 38 thereto. The anchor legs 38 extend each side of the pipeline 10 a distance equal about one and a half diameter of the wheel 14. This, of course, will be thrice the distance of the pipe, 10 of the ground. Analysis will show that it is necessary for the legs to be longer than the distance the pipe is supported from the ground which will be the radius of the wheels 14. I have had good success using an anchor leg of three times the radius of the wheel which means that the anchor leg will contact the ground at a 20° angle, causing the leg to dig into the ground well, and also be a sufficient distance away to anchor it properly. The end of the anchor leg has a fluke 40 on the top thereof to limit the amount the anchor leg digs into the earth.

Strut 42 extends form bolts 44 in top ears 46 to a point about midway of each of the anchor legs 38. The struts hold the anchor leg 38 in a rigid relationship to each other.

Fin 48 is attached as by welding to the strut and has a plurality of holes therethrough. Weight 50 has two ears 52 which straddle the strut 42 and weight bolt 54 extends through weight ears 52 and the holes in the fin 48 and therefore, secure the weight to the strut of the after leg of the anchor unit 20. It will be noted that as the system is rolled forward, the weight 50 will cause the aft leg 38 to drag lightly along the ground. I prefer to use a weight placed above the strut as near as practical to the pipe. If the weight 50 is placed so that it is appreciably lower than the pipeline 10, it will catch and be fouled with growing crops. Normally the system is designed so that the pipeline 10 is about the height of the highest crop being irrigated; therefore, any obstruction below the pipeline 10 will drag the crops being grown.

Inasmuch as each strut 42 has the fin 48 thereon, the weight 50 may be changed from one anchor leg 38 to the other. Therefore, the system may be reversed. When the system is run in reverse, the weights 50 may be changed to the other side so that always the aft anchor leg 38 is weighted so that it drags the ground.

Analysis will show that if a wind were to blow from the forward side of the system, the aft anchor leg 38 would be in contact with the ground and the wind blowing on it would force the point of the anchor leg into the ground to the fluke 40, preventing movement of the system.

However, if a wind is blowing from behind the system tending to roll the system forward, some means must be employed to cause the forward anchor leg to move downward in contact with the ground.

One possibility of a means for forcing the forward leg down would be a dog or lever which was pivoted to a wheel and which extended to strike the one or the other of the anchor legs upon rotation of the wheels upon forward rolling of the system. Such a leg could be held in an inoperative position by a cable, when not in use, the cable extending between the hub 16 and the pipe 10 through a race bolted to the pipeline 10.

However, I prefer to use wind vane 60 upon the hub 16. The wind vane 60 includes flat sheet of metal 62 which is in a radial plane of the hub 16 and therefore, of the pipe 10. It is supported by stanchion 64 which is attached as by welding to the hub within the top ears 46 and the metal sheet 62 is attached as by bolting to the stanchion 64. Therefore, if a wind comes from behind the system, the force of the wind upon the vane 60 will rotate the hub 16 and therefore the anchor legs 38 until the forward or leeward leg is placed in contact with the ground. Additional wind upon the vane 60 and upon the system itself will set the anchor leg into the ground. If at a later time the wind reverses so that it is blowing against the front of the system, the force of the wind will move the anchor unit 20 to the leeward of the pipe and then set that anchor into the ground.

The weight 50 may be adjusted to different positions wherein the weight bolt 54 is inserted through different holes in the fin 48 to adjust for the force or velocity of the wind necessary to move the forward leg 38 into contact with the ground for an aft wind.

I have prepared this description for those with ordinary skill in the art and therefore, any details of construction which would be obvious to those with ordinary skill in the art have not been shown and described. E.g., washers holding the rollers 32 in place, cotter keys holding the washers in place, etc. have not been shown inasmuch as they are well within the skill of ordinary mechanics. Likewise, flanges upon the pipe to prevent axial movement of the hub 16 have not been shown.

I have provided a device for automatically anchoring an irrigation pipe system so that is is not blown by the wind.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

In an agricultural irrigation system having
a. an elongated pipeline adapted to carry water under pressure,
b. said pipeline adapted to carry a plurality of sprinklers for sprinkling water from the pipeline one the ground, and
c. a plurality of wheels supporting said pipeline for transverse movement;
d. the improved anchoring means comprising:
e. a hub journaled to said pipeline,
f. two legs attached to the hub,
g. one of the legs extending to either side of the pipeline,
h. said legs being longer than the distance the pipeline is supported from the ground,
j. a weight on one leg for causing it to drag behind the line as the line is moved, and
k. set means for moving the forward leg into ground-engaging position.

2. The invention as defined in claim 1 with the additional limitation of
m. said set means being wind responsive.

3. The invention as defined in claim 1 with the additional limitation of
m. said set means being a wind vane attached to the hub above the pipeline.

4. The invention as defined in claim 1 with the additional limitations of
m. said weight being adjustable along the leg and
n. movable to the other leg so that the movement of the pipeline may be reversed.

5. The invention as defined in claim 4 with the additional limitation of
o. said set means being wind responsive.

6. The invention as defined in claim 4 with the additional limitation of
o. said set means being a wind vane attached to the hub above the pipeline.

7. In an agricultural irrigation system having
a. an elongated pipeline adapted to carry water under pressure,
b. said pipeline adapted to carry a plurality of sprinklers for sprinkling water from the pipeline onto the ground, and
e. a plurality of wheels supporting said pipeline for transverse movement;
d. the method of anchoring the pipeline comprising:
e. moving anchors into position by use of the force of the wind, and
f. setting the anchors into the ground responsive to the force of the wind.

8. The invention as defined in claim 7 with the additional limitation of
g. moving the anchors to the leeward of the pipeline responsive to the force of the wind.

9. In an agricultural irrigation system having
a. an elongated pipeline adapted to carry water under pressure,
b. said pipeline adapted to carry a plurality of sprinklers for sprinkling water from the pipeline onto the ground, and
c. a plurality of wheels supporting said pipeline for transverse movement;
d. the method of operation comprising:
e. carrying an anchor unit on the pipeline,
f. moving the pipeline transversely,
g. dragging the anchor unit to aft as the line is moved,
h. stopping the pipeline,
j. using the force of the wind to shift the anchor unit to leeward of the pipeline, and
k. setting the anchor unit in the ground responsive to the force of the wind.

* * * * *